March 18, 1924.

W. L. BRUNER 1,487,086

CLUTCH AND BRAKE COMBINED

Filed Nov. 17, 1922

WITNESSES

Inventor

William Leslie Bruner

March 18, 1924.　　　　　　　　　　　　1,487,086
W. L. BRUNER
CLUTCH AND BRAKE COMBINED
Filed Nov. 17, 1922　　　2 Sheets-Sheet 2

WITNESSES　　　　　　　　　　　　　　　Inventor
William Leslie Bruner

Patented Mar. 18, 1924.

1,487,086

UNITED STATES PATENT OFFICE.

WILLIAM LESLIE BRUNER, OF WICHITA FALLS, TEXAS.

CLUTCH AND BRAKE COMBINED.

Application filed November 17, 1922. Serial No. 601,566.

*To all whom it may concern:*

Be it known that I, WILLIAM LESLIE BRUNER, a citizen of the United States, residing at Wichita Falls, in the county of Wichita and State of Texas, have invented a new and useful Clutch and Brake Combined, of which the following is a specification.

The invention comprehends a clutch and brake combined to be used principally on heavy machinery, such as well drilling machinery and the like.

Another object of the invention is to provide a clutch and brake combined as hereinafter described, having a neutral position of both the clutch and brake. A provision is also made in this invention to prevent the clutch from being applied when the brake is on and also to prevent the brake from being applied when the clutch is in.

Another object of this invention is to provide a clutch in connection with a brake that will take a hold gradually and not jerk.

Another object of the invention is to provide a device of this nature that can be manufactured in connection with large hoisting or well drilling machinery, or can be made separate as an accessory and can be constructed at a very nominal cost.

The nature and advantages of the invention will be better understood when the following detailed description is read in connection with the accompanying drawing forming a part of this application. The invention residing in the construction, combination and arrangement of parts as claimed.

In the accompanying drawing the various parts are referred to by numbers. And, whereas, Figure 1 is a sectional view showing the general assembly.

Figure 1:
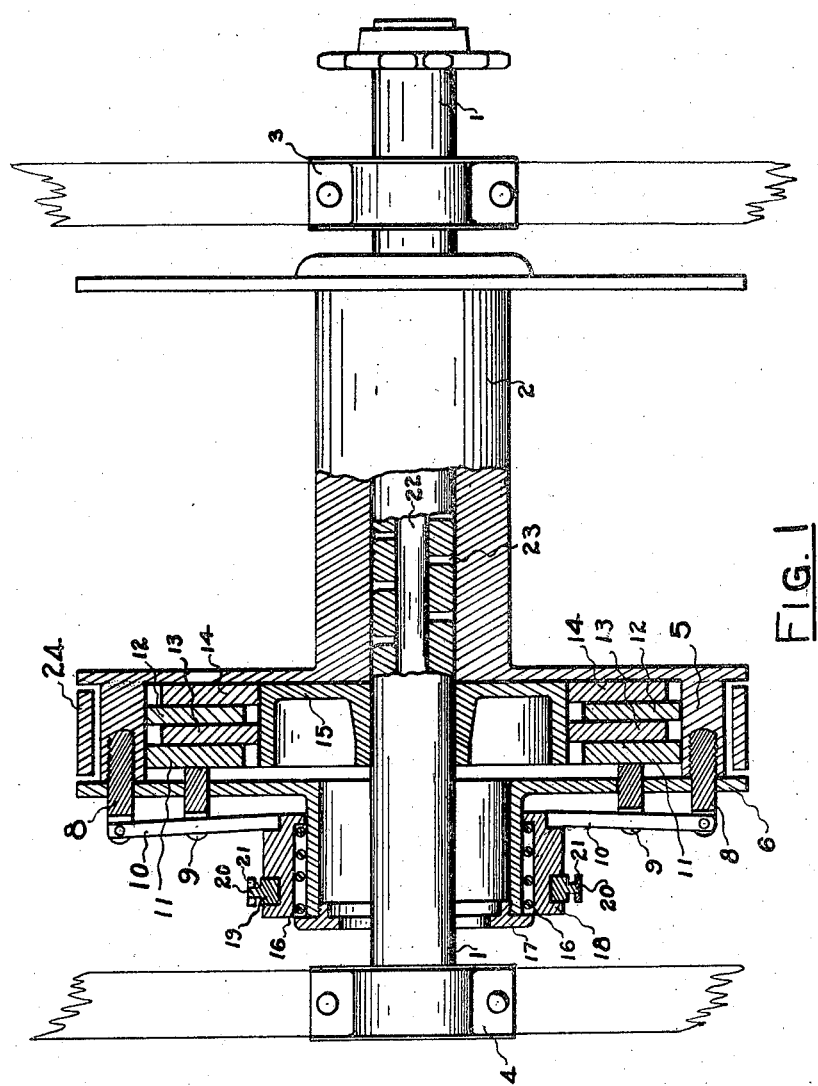
Figure 2:
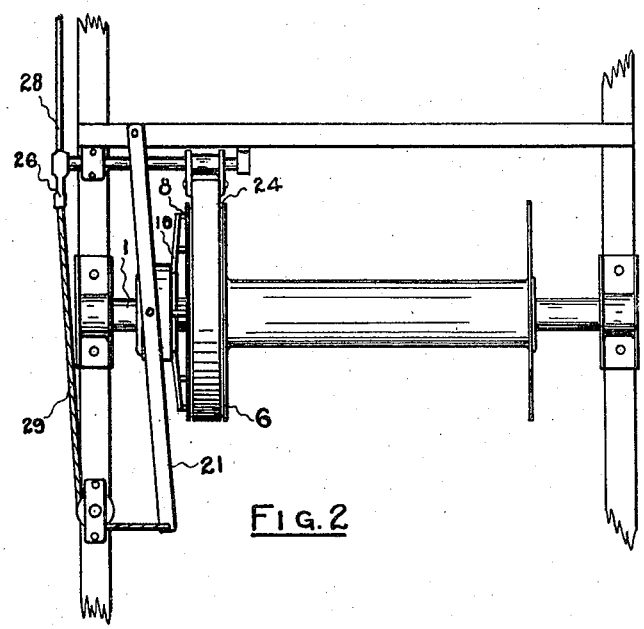
Figure 2 is a top view.
Figure 3:
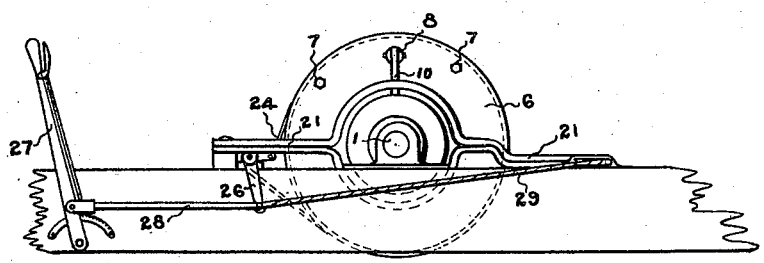
Figure 3 is an end view.

The device forming the subject matter of this invention comprises a hollow shaft 1, a spool or drum 2, a bearing 3 and a bearing 4, a clutch housing 5 forming a part of the spool or drum 2, the flange or clutch housing cover 6 is bolted to the clutch housing as illustrated at 7. The three or more slotted studs 8 are attached to the clutch housing 5 and the flange or cover 6, the slotted pins 9 are attached to the clutch fingers 10 and extend through the flange or cover 6 to the clutch disk 11, the disk 11 and the disk 12 are fastened to the clutch housing 5, the disk 13 and the disk 14 are attached to a driving collar 15, which is attached to the hollow shaft 1, the spring 16 fits over a part of the flange 6 and is held in place by a retaining nut 17, threaded to the inside of said flange, 18 is a compressing collar that operates the clutch fingers 10, 19 is a loose collar arranged in the compressing collar 18, 20 is two pins attached to the loose collar 19, and are associated with the clutch operating lever 21, the hollow space in the shaft 1 serves as an oil reservoir. The holes 23 in the hollow shaft 1 convey oil to the bearing surface between the spool or drum 2 and the shaft 1. The shaft 1 is provided with screw caps at each end to hold the oil. The brake band 24 surrounds the outside of the clutch housing 5, one end being anchored as illustrated and the other end attached to the brake arm 26. The clutch and brake lever 27 is connected to the brake arm 26 with a rod 28, 29 is a cable or chain connected to the brake arm 26 and the clutch operating lever 21, thus it will be noted that by pulling the lever 27 as far as possible in the opposite direction of the clutch assembly the cable or chain 29, which is attached thereto will pull the clutch operating lever 21 out and release the clutch, the rod 28, which is attached to the brake arm 26 will pull said arm back and apply the brake 24. When the lever 27 is moved as far as possible towards the clutch assembly the brake arm 26 will release the brake 24 and the cable or chain 29 will release the clutch operating lever 21, the spring 16 will move the compressing collar 18 that moves the clutch fingers 10 and the pins 9. The pins 9 push against the clutch disk 11, which causes the clutch to take a hold. When the lever 27 is moved half way between the two positions above described said clutch and brake will be in a natural position.

While it is believed from the foregoing description the nature and advantages of the device will be readily apparent, I desire to have it understood that I do not limit myself to what is herein shown and described, and that such changes may be resorted to when desired as fall within the scope of what is herein claimed.

What I claim is:

A clutch and brake combined, comprising a hollow shaft capped at each end and having holes therein to oil the bearing between the drum and said shaft, the drum having flanges on each end thereof the clutch comprising four or more disks, having two or more of said disks attached to a driving collar, which forms a part of said hollow shaft, and two or more of said disks attached to a clutch housing, which forms a part of said drum, a coil spring, a compressing collar, three or more clutch fingers each having a pin attached thereto, which make contact with the said disks, a spring retaining nut to hold said coil spring in place, a clutch operating lever to operate said clutch, and the attachments thereto, a brake comprising a brake band surrounding the said clutch housing with one end anchored to a frame by any suitable means, and the other end attached to a brake arm, said brake arm being attached to a clutch and brake lever by means of a rod.

WILLIAM LESLIE BRUNER.

Witnesses:
C. B. PONEAS,
FRED L. BRONSON.